US009223606B1

(12) United States Patent
Vaidya et al.

(10) Patent No.: US 9,223,606 B1
(45) Date of Patent: Dec. 29, 2015

(54) AUTOMATICALLY CONFIGURING AND MAINTAINING CLUSTER LEVEL HIGH AVAILABILITY OF A VIRTUAL MACHINE RUNNING AN APPLICATION ACCORDING TO AN APPLICATION LEVEL SPECIFIED SERVICE LEVEL AGREEMENT

(75) Inventors: Anish Vaidya, San Jose, CA (US); Venkeepuram Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 563 days.

(21) Appl. No.: 13/308,421

(22) Filed: Nov. 30, 2011

(51) Int. Cl.
*G06F 9/455* (2006.01)

(52) U.S. Cl.
CPC .................. *G06F 9/45558* (2013.01)

(58) Field of Classification Search
None
See application file for complete search history.

(56) References Cited

U.S. PATENT DOCUMENTS

| 8,429,097 | B1 * | 4/2013 | Sivasubramanian et al. ... 706/12 |
| 2006/0253725 | A1 * | 11/2006 | Chen et al. ......................... 714/4 |
| 2009/0119664 | A1 * | 5/2009 | Pike et al. .......................... 718/1 |
| 2010/0235832 | A1 * | 9/2010 | Rajagopal et al. ................ 718/1 |
| 2011/0246992 | A1 * | 10/2011 | Kern ............................. 718/100 |
| 2013/0124712 | A1 * | 5/2013 | Parker ........................... 709/224 |

* cited by examiner

*Primary Examiner* — Dong Kim
(74) *Attorney, Agent, or Firm* — Brill Law Office; Jeffrey Brill

(57) ABSTRACT

A process running on a virtual machine determines an application level specified SLA, according to which an application is to be made available. The virtual machine level process transmits the SLA to a process running on a cluster infrastructure. The cluster infrastructure level process uses high-availability cluster functionality to configure the cluster infrastructure to make the application available as specified by the SLA. Where the SLA specifies failover support for the virtual machine on which the application is running, nodes of the cluster infrastructure are made available for this purpose. The application is thus made available as specified by the SLA. This can be done without requiring an application administrator to have access to the cluster infrastructure, or participation by an infrastructure administrator.

20 Claims, 4 Drawing Sheets

AUTOMATICALLY CONFIGURING AND MAINTAINING CLUSTER LEVEL HIGH AVAILABILITY OF A VIRTUAL MACHINE RUNNING AN APPLICATION ACCORDING TO AN APPLICATION LEVEL SPECIFIED SERVICE LEVEL AGREEMENT

TECHNICAL FIELD

This disclosure pertains generally to application high availability, and more specifically to automatically configuring and maintaining cluster level high availability of a virtual machine running an application according to an application level specified service level agreement.

BACKGROUND

In the world of virtual computing, virtual machines (VMs or guests) can be instantiated at a software level on physical computers (host computers or hosts). In various virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer. Even where a host operating system is present, the hypervisor sometimes interfaces directly with the hardware for certain services. In some virtualization scenarios, the host itself is in the form of a guest (i.e., a virtual host) running on another host. The services performed by a hypervisor are, under certain virtualization scenarios, performed by a component with a different name, such as "supervisor virtual machine," "virtual machine manager (VMM)," "service partition," or "domain 0 (dom0)." (The name used to denote the component (s) performing this functionality can vary between implementations, products and/or vendors.) In any case, just as server level software applications such as databases, enterprise management solutions and e-commerce websites can be run on physical computers, so too can server applications be run on virtual machines.

High-availability clusters (also known as HA clusters or failover clusters) are groups of computers that support running server applications with a minimum of down-time. A high-availability cluster uses groups of redundant computing resources in order to provide continued service when individual system components fail. More specifically, high-availability clusters eliminate single points of failure by providing multiple servers, multiple network connections, redundant data storage, etc. Absent clustering, if a server running a particular application fails, the application would be unavailable until the server is restored. In high-availability clustering, the failure of a server (or of a specific computing resource used thereby such as a network adapter, storage device, etc.) is detected, and the application that was being run on the failed server is automatically restarted on another computing system (i.e., another node of the cluster). This process is called "failover." As part of this process, clustering software can configure the node to which the application is being moved, for example mounting a filesystem used by the application, configuring network hardware, starting supporting applications, etc. High-availability clusters typically use a heartbeat private network connection to monitor the status of each node in the cluster. High-availability clusters are often used for critical server applications such as enterprise databases, important business applications, electronic commerce websites, etc.

In cloud-based computing environments, computing resources such as processing power, storage and software applications are provided as services to users over a network (e.g., the internet). In cloud computing, the use of virtual machines is common to isolate specific computing resources within the cloud for specific users (e.g., different organizations or enterprises that are receiving computing services from the cloud). For example, running a plurality of virtual machines on one or more underlying physical computers lends itself well to partitioning computing resources to different organizational users over the cloud, while keeping the resources of the different users separate, private and secure.

In a private cloud, a set of computing resources is operated for a single organizational user, and made available to that organization over a network. Virtual machines are commonly used in private cloud environments too. For example, because virtual machines can be suspended and restarted on different hosts, the use of virtual machines in a private cloud provides mobility.

In order to provide an application with high availability in a cloud environment (private or otherwise), the application can be run on a virtual machine which is in turn running on a high-availability cluster. The virtual machine provides the desired mobility and isolation of the application, whereas the underlying high-availability cluster provides the highly available computing infrastructure. It is important to understand that in this scenario there separate levels of availability: the availability of the application is dependent on the virtual machine being available, and the availability of the virtual machine is dependent upon the underlying physical computing infrastructure being available, i.e. the infrastructure of the high-availability cluster on which the virtual machine is running.

The administrator of the application running on the virtual machine is responsible for ensuring that the application is available to the organizational user according to a service level agreement (SLA). An SLA specifies the level of availability which the organization is to be provided, which is typically tied to an amount paid by the organization. For example, an SLA could specify a specific number of nodes within the cluster available for failover to the virtual machine on which the application runs in the event that the host crashes. An SLA can also specify that in the event of a cluster failure, one or more other clusters are available to the application for disaster recovery. At a high level, an SLA can be thought of as specifying the nodes within a given cluster as well as the other clusters (if any) available to an application in the case of infrastructure failure.

Software tools exist to monitor the health and status of an application, including an application running on a virtual machine. Such tools run on the computer (virtual or physical) on which the application runs, and automatically detect any application level failure. These tools can also automatically restart the application on the computer (e.g., the virtual machine). Thus, so long as the virtual machine on which an application is running is available and capable of running the application, any application level crashes can be managed without moving the virtual machine to a different node or cluster. For example, an application high availability tool running on the virtual machine can detect the failure of the application, and automatically restart the application on the virtual machine.

Software tools also exist to monitor the health and status of virtual machines. These tools run on the host on which the virtual machine runs, and automatically detect any failure of the virtual machine. These tools can also automatically reboot the virtual machine on the host. Thus, so long as the underlying host on which the virtual machine is running is itself available and capable of running the virtual machine, any virtual machine level crashes can be managed without moving the virtual machine to a different node or cluster.

The administrator of an application being served from a cluster to an organizational user over a network (e.g., as a cloud service) only has control over the application and the virtual machine on which the application is running. Thus, the application administrator can configure the application and virtual machine to address application level failure and virtual machine level failure, for example through the use tools such as those described above, or by manually configuring or restarting the application and/or the virtual machine. Since the application administrator has access to the application and virtual machine, the application administrator can configure these components to manage failures that occur at these levels.

However, the application administrator does not have control over or access to the infrastructure of the high-availability cluster. Thus, the application administrator cannot configure the infrastructure to address failures at a node or cluster level. Providing application availability according to an SLA can require configuration of the infrastructure for failover and disaster recovery, in the event that a failure occurs at an infrastructure level, as opposed to an application or virtual machine level. For example, suppose an application is running on a virtual machine, and the physical host on which the virtual machine runs fails. In this case, the virtual machine (along with the application it is running) would need to be failed over to another host to keep the application available. In a case where the whole cluster fails, the virtual machine would need to be moved to another cluster to remain available. Because the application administrator only has access to the application and the virtual machine it runs on, but not to the cluster infrastructure, the application administrator is not able to configure the infrastructure to support moving the virtual machine between nodes in the cluster or between clusters in order to keep the virtual machine and its application available in the event of infrastructure level failure.

An infrastructure administrator who is logged into the high-availability cluster and has infrastructure level access can configure the infrastructure to support failover of virtual machines between nodes and clusters. However, an infrastructure administrator may or may not be present or available when an application administrator wishes or needs to configure an application being run on a virtual machine hosted on the infrastructure to be highly available according to an SLA which specifies failover between nodes or disaster recovery between clusters. This interferes with the high availability and mobility of the application, both of which are important within the context of high-availability clusters and cloud computing environments such as private clouds.

It would be desirable to address these issues.

SUMMARY

A high-availability cluster is automatically configured to make an application available according to a service level agreement (SLA). The high-availability cluster comprises a cluster infrastructure made up of at least one cluster of nodes. The application being made available according to the SLA runs on a virtual machine, which runs on a node of a cluster. A process running on the virtual machine determines the SLA according to which the application is to be made available. The SLA is specified at an application level, by a party with access to the virtual machine but without access to the cluster infrastructure. The SLA can be determined, for example, by reading a configuration file populated by an application administrator.

A process running on the virtual machine transmits the SLA to a process running on the cluster infrastructure. The process running on the cluster infrastructure that receives the transmitted SLA can run, for example, on the node of the cluster on which the virtual machine is hosted. A process running on the cluster infrastructure uses high-availability cluster functionality to configure automatically the cluster infrastructure to make the application available as specified by the SLA, for example by running a high-availability cluster configuration script with parameters specifying contents of the SLA. Where the SLA specifies failover support for the virtual machine on which the application is running, the number of nodes of the cluster infrastructure specified by the SLA are made available for failover of the virtual machine. Where the SLA specifies support for disaster recovery migration, at least one additional cluster of the cluster infrastructure is made available for this purpose. The application is thus made available as specified by the SLA. Note that the application can be made available as specified by the SLA without requiring that an application administrator have access to the cluster infrastructure, and without requiring participation by an infrastructure administrator.

A process running on the virtual machine can monitor the status of the application running thereon. The status of the application that is being monitored is repeatedly transmitted, by a process running on the virtual machine, to a process running on the cluster infrastructure. If the application running on the virtual machine fails, this failure is detected, and a message indicating the detected failure of the application is transmitted to a process running on the cluster infrastructure. The status of the virtual machine on which the application runs can also be monitored, such that a failure of the virtual machine is detected. In response to the failure of the application and/or the virtual machine, the virtual machine on which the application runs can be failed over to another node in the cluster infrastructure, as specified by the SLA.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
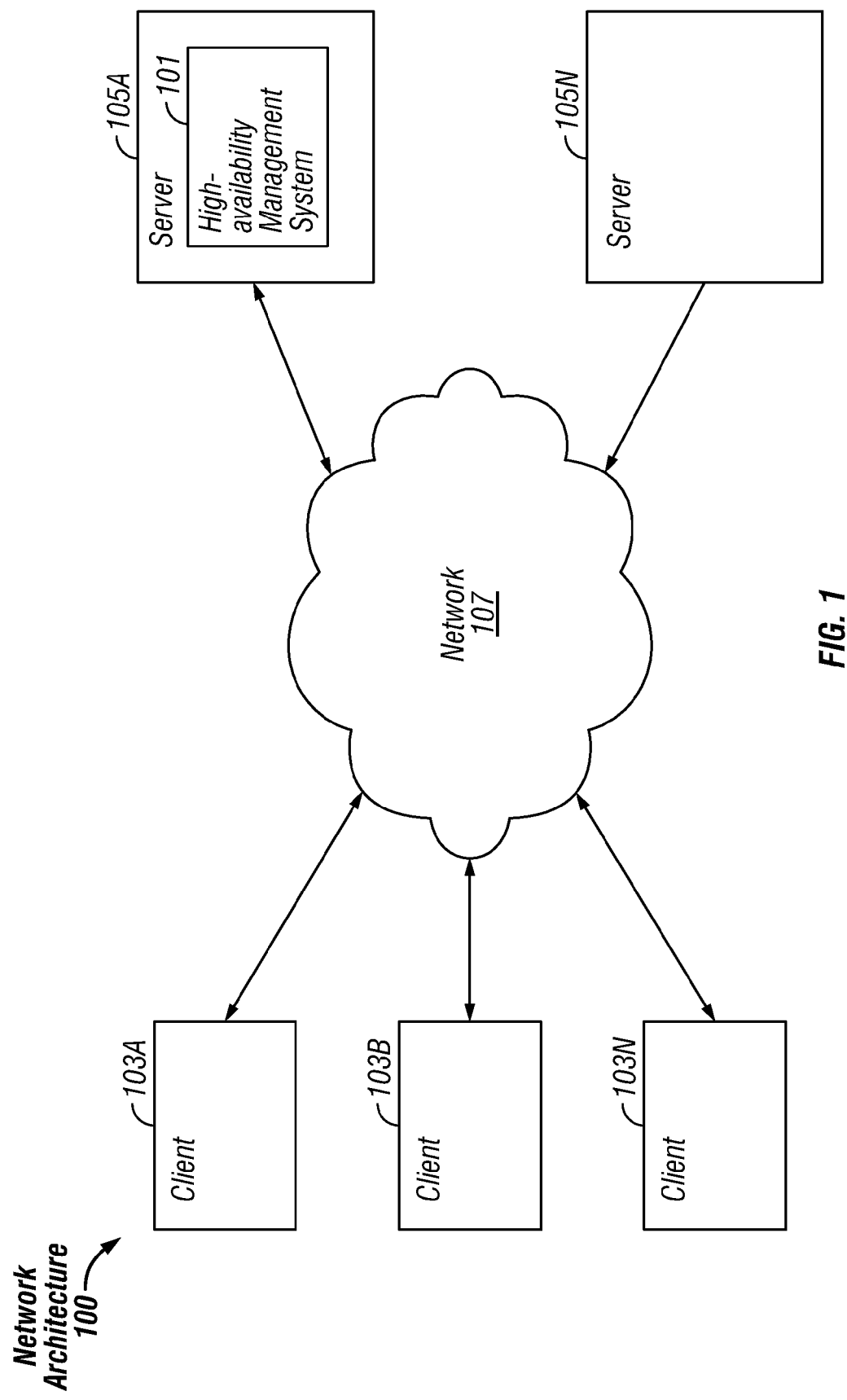
FIG. 1 is a block diagram of an exemplary network architecture in which a high-availability management system can be implemented, according to some embodiments.

FIG. 1 is a block diagram illustrating an exemplary network architecture 100 in which a high-availability management system 101 can be implemented. The illustrated network architecture 100 comprises multiple clients 103A, 103B and 103N, as well as multiple servers 105A and 105N. In FIG. 1, the high-availability management system 101 is illustrated as residing on server 105A. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
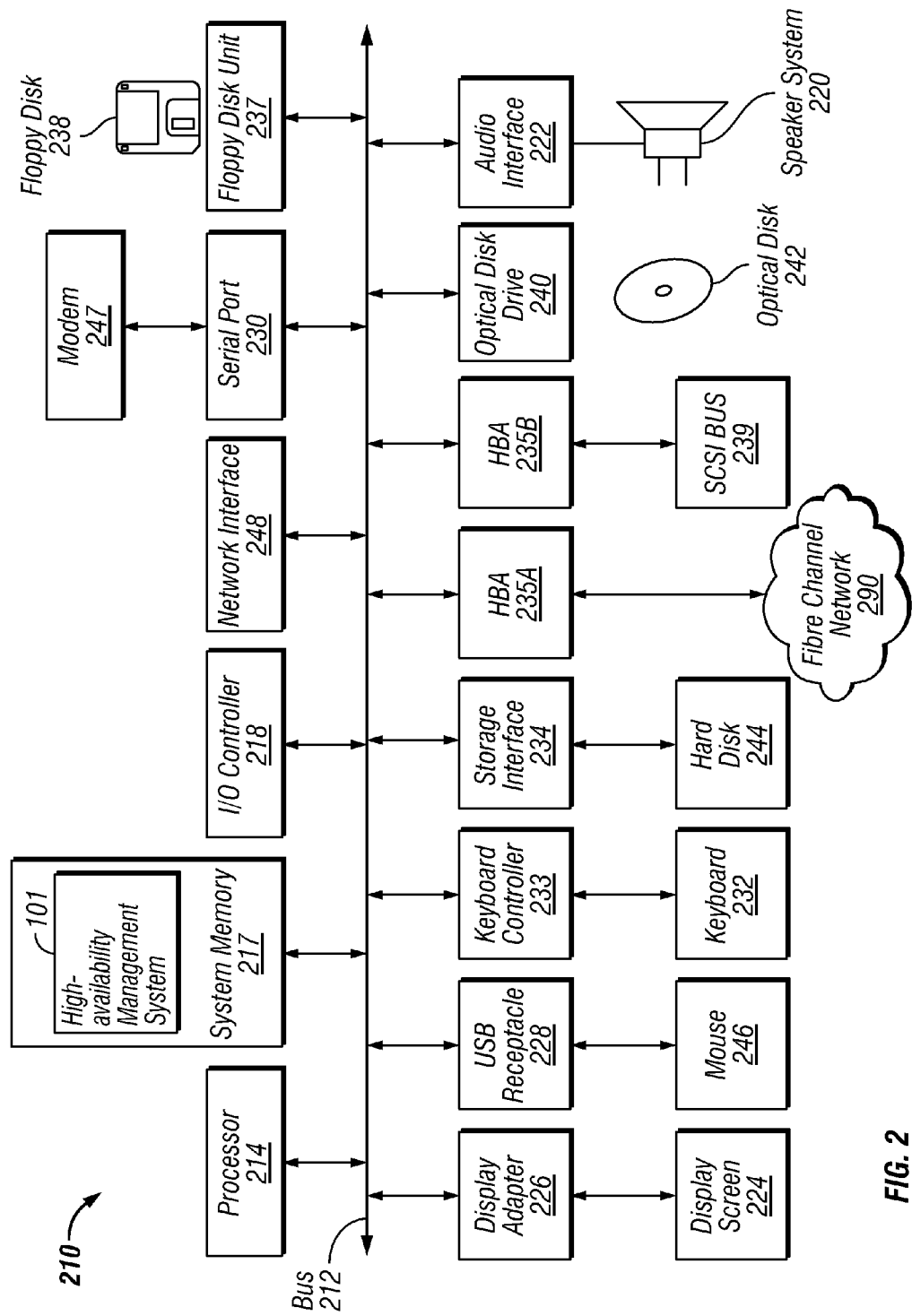
FIG. 2 is a block diagram of a computer system suitable for implementing a high-availability management system, according to some embodiments.

FIG. 2 is a block diagram of a computer system 210 suitable for implementing a high-availability management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the high-availability management system 101 is illustrated as residing in system memory 217. The workings of the high-availability management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
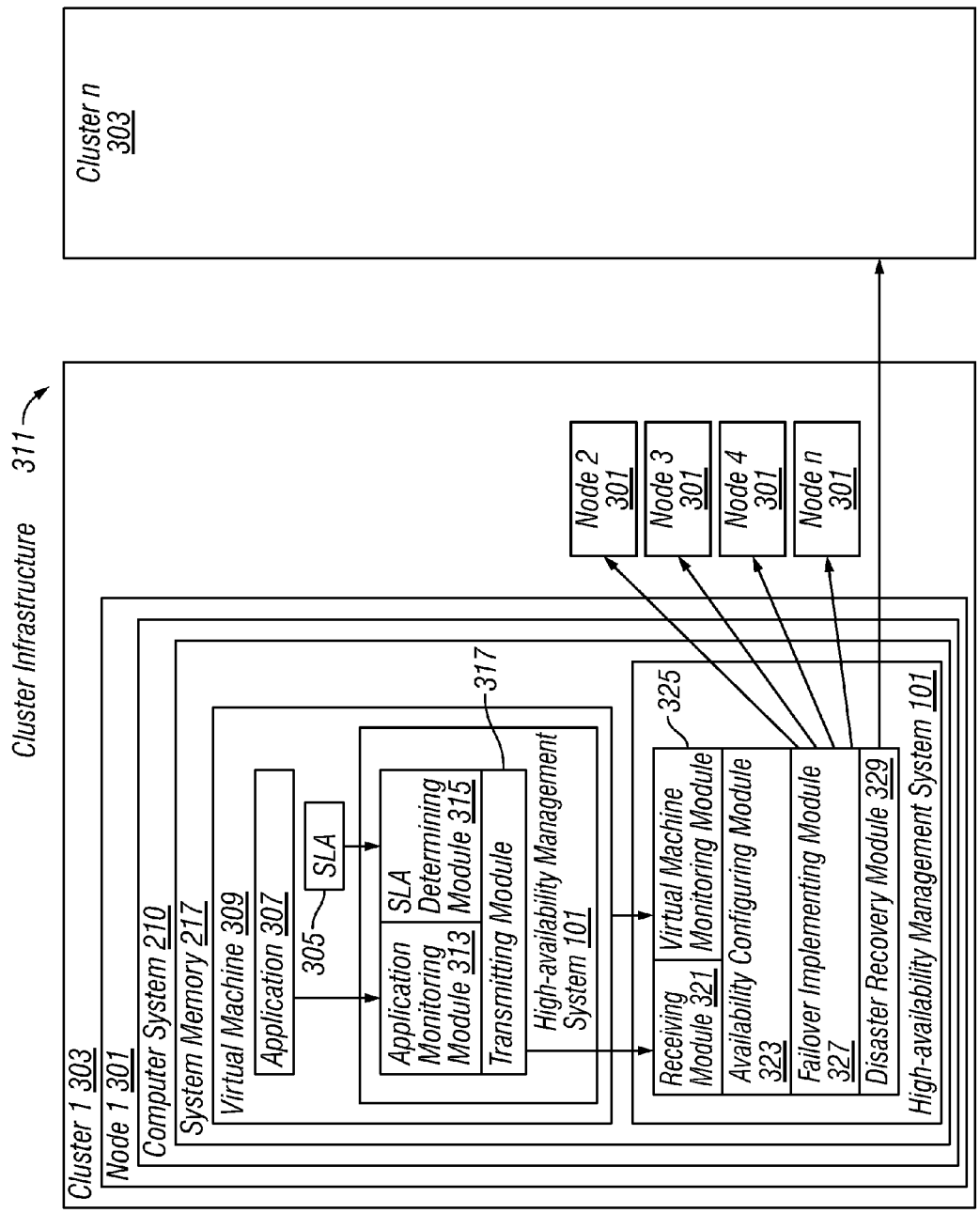
FIG. 3 is a block diagram of the operation of a high-availability management system, according to some embodiments.

FIG. 3 illustrates the operation of a high-availability management system 101 residing in the system memory 217 of a computer system 210, according to some embodiments. As described above, the functionalities of the high-availability management system 101 can reside on a client 103, a server 105, or be distributed between multiple computer systems 210, including within a cloud-based computing environment in which the functionality of the high-availability management system 101 is provided as a service over a network 107. It is to be understood that although the high-availability management system 101 is illustrated in FIG. 3 as a single entity, the illustrated high-availability management system 101 represents a collection of functionalities, which can be instantiated as a single or multiple modules as desired (an instantiation of specific, multiple modules of the high-availability management system 101 is illustrated in FIG. 3). It is to be understood that the modules of the high-availability management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the high-availability management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a high-availability management system 101 enables the automatic configuration of nodes 301 and clusters 303 to provide availability according to an SLA 305 for an application 307 running on a virtual machine 309, without requiring the involvement of an infrastructure administrator. In FIG. 3, a first cluster 303 (cluster 1) is illustrated comprising a plurality of nodes 301. It is to be understood that although only five nodes 301 are illustrated in FIG. 3 (nodes 1, 2, 3, 4 and n), in practice a cluster 301 would typically comprise many more nodes 301. Additionally, for purposes of this specification, nodes 301 can be thought of as comprising black boxes of computing resources. A node 301 can comprise a server 105 instantiated on one or more physical computers 210 of the type illustrated in FIG. 2, but can further comprise additional computing resources such as redundant storage, network interfaces, etc. Nodes 301 can be instantiated in different ways in different embodiments. A node 301 comprises a unit of computing resources in the form of infrastructure of the cluster 303 of which the node 301 is a part.

It is to be further understood that the second cluster 303 illustrated in FIG. 3 (cluster n) also comprises a plurality of nodes 301, although the nodes 301 of that cluster 303 are not specifically illustrated. Furthermore, although only two clusters 303 are illustrated, a high-availability clustering system can include more clusters 303 than that.

As illustrated in FIG. 3, an application 307 runs on a virtual machine 309 which in turn runs on a node 301 (node 1) of a cluster 303 (cluster 1). Node 1 is specifically illustrated as including a computer system 210 with system memory 217 in which the virtual machine 309 runs. Thus, the computer system 210 of node 1 comprises the host of the virtual machine 309. The application 307 running on the virtual machine 309 is served to an organizational user through the network 107 according to an SLA 305.

As illustrated in FIG. 3, a component of the high-availability management system 101 runs on the virtual machine 309 on which the application 307 runs, and a component of the high-availability management system 101 runs on the host (e.g., the physical computer 210 comprising the node 301 on which the virtual machine 309 runs). In other embodiments, the component of the high-availability management system 101 that does not run on the virtual machine does not run on the host, but instead elsewhere within the infrastructure comprising the cluster (e.g., on a designated availability management node 301).

A service level agreement (SLA) determining module 315 of the virtual machine level component of the high-availability management system 101 determines the service level agreement (SLA) 305 according to which the application 307 is to be made available to the organizational user. In one embodiment, the SLA determining module 315 does this by reading a configuration file on the virtual machine 309. This configuration file can be populated by the application administrator, who has access to the virtual machine 309 and thus can write files thereto. In other embodiments, the SLA determining module 315 gleans this information other ways, for example through a command line parameter, environment variable, user interface, etc. In any case, the SLA determining module 315 determines the SLA 305 provided at an application level, and specifying the parameters according to which the application 307 is to be made available. In other words, the SLA 305 is specified at an application level, not a cluster infrastructure level, and can be specified by a party (e.g., an application administrator) with no access (e.g., read, write, execute and/or even login access) to the cluster infrastructure 311). Although the party specifying the SLA 305 according to which the application 307 is to be made available has access to the application 307 and the virtual machine 309 on which the application 307 runs, the party might not have any access to the underlying cluster infrastructure 311.

Examples of possible SLA 305 contents include: 1. Attempt only to restart the virtual machine 309 on its current host (node 301), but do not fail it over to any other node 301; 2. Make the virtual machine 309 highly available by attempting, where necessary, failover to another node 301 (or up to a specific number of other nodes 301); 3. Configure disaster recovery for the virtual machine 309 by, where necessary, attempting to move it to another (or other) cluster(s) 303. These are only examples of possible SLA 305 specifications. An SLA 305 can specify any level of availability supported by the underlying infrastructure of the cluster(s) 303.

A transmitting module 317 of the virtual machine level component of the high-availability management system 101 communicates with a receiving module 321 of the cluster infrastructure level component of the high-availability management system 101. When the SLA determining module 315 determines the SLA 305 according to which to make the application available, the transmitting module 317 on the virtual machine side transmits the SLA 305 to the receiving module 321 on the cluster infrastructure 311 side. When the receiving module 321 receives the SLA 305, an availability configuring module 323 of the cluster infrastructure level component of the high-availability management system 101 uses high-availability cluster functionality to automatically configure the cluster infrastructure 311 to make the application 307 available as per the SLA 305. In one embodiment, the availability configuring module 323 runs a high-availability cluster configuration script with parameters specifying the contents of the SLA 305. The configuration script then runs high-availability cluster commands on the cluster infrastructure 311 to make the application available according to the SLA 305. In other embodiments, the availability configuring module 323 executes the high-availability cluster functionality to support the SLA 323 in ways other than by running a script, for example by calling high-availability cluster commands through an API. In any case, the availability configuring module 323 runs at a cluster level, and is thus able to access and configure the cluster infrastructure 311.

Where the SLA 305 specifies failover support for the virtual machine 309 on which the application 307 is running, the availability configuring module 323 initiates the appropriate high-availability cluster functionality so that the number of nodes 301 specified by the SLA 305, with the appropriate resources (e.g., storage, network connectivity) for the virtual machine 309, be made available for failover (e.g., in the event of host failure). If the SLA 305 specifies support for disaster recovery migration to another cluster 303, the availability configuring module 323 initiates the appropriate high-availability cluster functionality to make one or more additional cluster(s) 303 available in the event of a disaster level failure requiring migration to a different cluster 303. At a high-availability cluster level, configuring such disaster recovery typically involves enabling an entity on the primary cluster 303 (e.g., the availability configuring module 323 or the script it runs) to communicate with and access the secondary (disaster recovery) cluster(s) 303.

Execution of high-availability cluster functionality to make additional nodes 301 available for failover and additional clusters 303 available for disaster recovery is sometimes called populating the failover domain, wherein the failover domain comprises the node(s) 301 and/or cluster(s) 303 to which an entity being made available can be failed over. In the context of this terminology, the availability configuring module 323 populates a failover domain for the virtual machine 309 running the application 307 so as to support the SLA 305. Note that where the SLA 305 indicates support only for restarting the virtual machine 309 on its current host but not for failover, only the current host (node 301) is included in the failover domain. On the other hand, where the SLA 305 indicates support for failover and/or disaster recovery, the indicated additional nodes 301 and/or clusters 303 are included in the failover domain.

By communicating the SLA 305 from the virtual machine 309 to the cluster infrastructure 311, the high-availability management system 101 is able to automatically configure the cluster infrastructure 311 to support an SLA 305 specified at a virtual machine level, on the cluster infrastructure 311, without requiring infrastructure level access or an infrastructure administrator. In other words, an application administrator without cluster infrastructure level access can specify an SLA 305 that includes support for cluster infrastructure level failover and disaster recovery, and the cluster infrastructure 311 is automatically configured to support the SLA 305.

When a virtual machine 309 running an application 307 being made available by the high-availability management system 101 runs on a host, an application monitoring module 313 of the virtual machine component of the high-availability management system 101 monitors the status of the application 307. In other words, the application monitoring module 313 runs on the virtual machine 309 running the application 307, and monitors the health and status of the application 307. The application monitoring module 313 detects if the application 307 locks-up, crashes, stops running, becomes unstable, etc.

The transmitting module 317 of the virtual machine level component of the high-availability management system 101 repeatedly transmits the monitored status of the application 307 that is running on the virtual machine 309. If the application 307 is running properly, the transmitting module 317 periodically sends a message so indicating. If the application 307 fails, this is detected by the monitoring module 313, and the transmitting module 317 sends a special message so indicating to the receiving component 321. Thus, the cluster infrastructure level component of the high-availability management system 101 is informed of availability problems with the application 307 by these special messages.

A virtual machine monitoring module 325 of the cluster infrastructure level component of the high-availability management system 101 monitors the status of the virtual machine 309 running on the host. The virtual machine monitoring module 325 runs at an infrastructure level (recall that the host is part of the infrastructure), and monitors the health and status of the virtual machine 309. If the virtual machine 309 locks-up, crashes, stops running or the like, this is detected by the virtual machine monitoring module 325.

Thus, if either the application 307 being made available according to the SLA 305 or the virtual machine 309 on which the application 307 is running fail, this failure is detected. It is to be understood that some failures of the application 307 or virtual machine 309 will not require failover to a different node 301. For example, some application 307 crashes can be managed by restarting the application 307 on the virtual machine 309, and some virtual machine 309 crashes can be managed by restarting the virtual machine 309 on the same host. However, certain types of failures, such as applications 307 or virtual machines 309 that repeatedly fail when restarted, as well as failure of the host itself, are appropriately responded to by failover to a different node 301. The specific circumstances under which to execute failover is a design parameter which can vary between embodiments.

In a case in which the problem with the application 307 and/or virtual machine 309 necessitates failover, and failover is in fact included in the SLA 305, a notification of the failure is transmitted to a failover implementing module 327 of the cluster infrastructure level component of the high-availability management system 101. In the case of application 307 failure, this message is transmitted to the failover implementing module 327 by the receiving module 321, which in turn receives it from the transmitting module 317 on the virtual machine side. In the case of a virtual machine 309 failure, the virtual machine monitoring module 325 transmits an appropriate message to the failover implementing module 327. The failover implementing module 325 proceeds to use high-availability cluster functionality to configure a node 301 in the failover domain for running the virtual machine 309. This can include steps such as configuring storage and/or network resources on the node 301 so that upon failover, the appropriate resources are available for the virtual machine 309. The failover implementing module 325 then brings up the virtual machine 309 on the node 301, and starts the application 307 on the virtual machine 309, thereby implementing the failover and keeping the application 307 available as per the SLA 305.

In a similar manner, where problems with the application 307 and/or virtual machine 309 necessitate disaster recovery which is included in the SLA 305, a notification of the failure is transmitted to a disaster recovery implementing module 329 of the cluster infrastructure level component of the high-availability management system 101. The disaster recovery implementing module 329 then uses high-availability cluster functionality to configure a disaster recovery cluster 303 and implement the disaster recovery so as to keep the application 307 available as per the SLA 305.

Thus, by communicating the SLA 305 and appropriate application 307 and virtual machine 309 status information between the virtual machine 309 and the cluster infrastructure 311, the high-availability management system 101 is able to automatically implement the SLA 305, which can include support for failover and disaster recovery, on the cluster infrastructure 311, without requiring an infrastructure administrator, and without requiring that the application administrator have access to the infrastructure.

Figure 4:
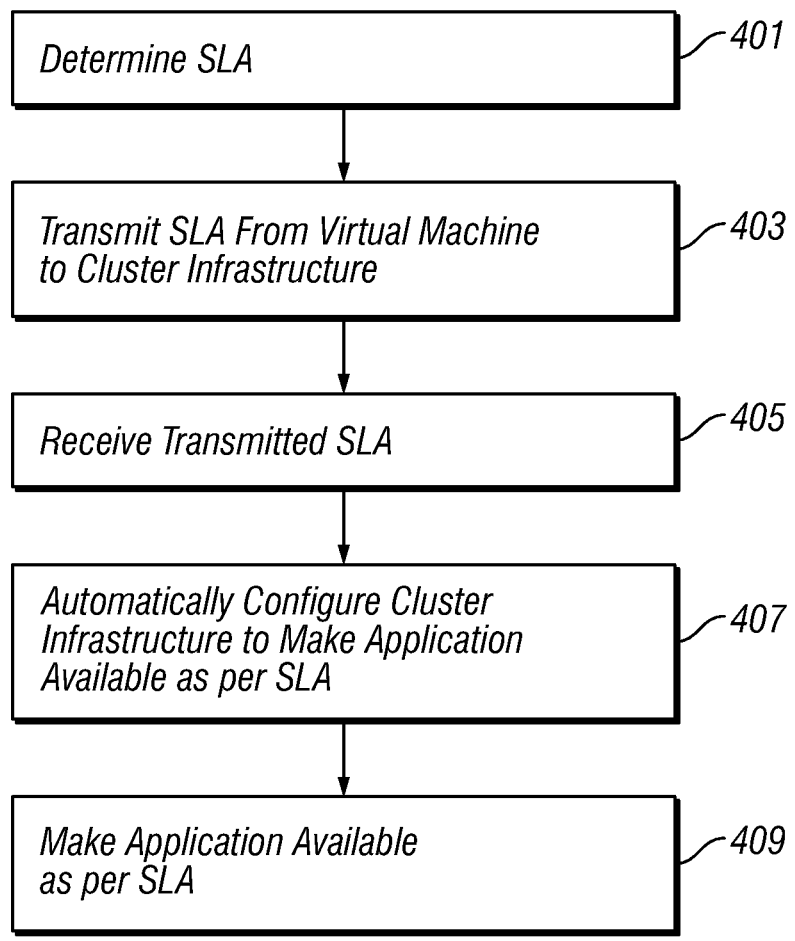
FIG. 4 is a flowchart of the operation of a high-availability management system, according to some embodiments.

FIG. 4 illustrates steps of the operation of the high-availability management system 101, according to some embodiments. The SLA determining module 315 of the virtual machine level component of the high-availability management system 101 determines 401 the SLA 305 according to which the application 307 is to be made available. The transmitting module 317 of the virtual machine level component of the high-availability management system 101 transmits 403 the SLA 305 to a process running on the cluster infrastructure 311. The receiving module 321 of the cluster infrastructure level component of the high-availability management system 101 receives 405 the transmitted SLA 305. The availability configuring module 323 of the cluster infrastructure level component of the high-availability management system 101 automatically configures 407 the cluster infrastructure 311 to make the application 307 available as per the SLA 305, by using high-availability cluster functionality. The availability configuring module 323 thus makes 407 the application 307 available as specified by the SLA 305, without requiring that an application administrator have access to the cluster infrastructure 311 and without requiring participation by an infrastructure administrator.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically configuring failover according to an application level service level agreement (SLA) for availability of a user application on a high-availability cluster, with a cluster infrastructure comprising:

at least one cluster of nodes, the user application running on a virtual machine, the virtual machine running on a specific node of the at least one cluster, the method comprising the steps of:
gleaning parameters for failover from the application level SLA, by a first process running on the virtual machine, the user application running on the virtual machine as an isolated environment from the cluster infrastructure;
wherein the application level SLA was specified at an application level, by a party with an application level access to the virtual machine but without access to the cluster infrastructure;
configuring the virtual machine in accordance with the application level SLA;
detecting an application level failure of the virtual machine in accordance with the application level SLA;
transmitting the application level SLA through process-to-process communication to affect failover of the user application within the cluster infrastructure, by sending the application level SLA by the first process running on the virtual machine containing the user application to a second process running on the cluster infrastructure, wherein the first and second process are on a different nodes within the cluster;
receiving, by the second process running on the cluster infrastructure, failover parameters specified by the application level SLA; and
configuring failover of high-availability cluster functionality with a high-availability configuration script according to the application level SLA, by the second process running on the cluster infrastructure, such that the cluster infrastructure makes the user application available as specified by the application level SLA.

2. The method of claim 1 wherein determining, by a process running on the virtual machine, the application level SLA according to which the user application is to be made available further comprises:
reading a configuration file populated by an user application administrator.

3. The method of claim 1 wherein receiving, by a process running on the cluster infrastructure, the application level SLA that was specified at the application level further comprises:
receiving the application level SLA by a process running on the specific node of the at least one cluster on which the virtual machine is running.

4. The method of claim 1 wherein using high-availability cluster functionality, by a process running on the cluster infrastructure, to configure automatically the cluster infrastructure to make the user application available as specified by the application level SLA further comprises:

running a high-availability cluster configuration script with parameters specifying contents of the application level SLA.

5. The method of claim 1 wherein using high-availability cluster functionality, by the second process running on the cluster infrastructure, to configure automatically the cluster infrastructure to make the user application available as specified by the application level SLA further comprises:
responsive to the application level SLA specifying failover support for the virtual machine on which the user application is running, making a number of nodes of the cluster infrastructure specified by the application level SLA available for failover of the virtual machine.

6. The method of claim 1 wherein using high-availability cluster functionality, by the second process running on the cluster infrastructure, to configure automatically the cluster infrastructure to make the user application available as specified by the application level SLA further comprises:
responsive to the application level SLA specifying support for disaster recovery migration, making at least one additional cluster of the cluster infrastructure available for disaster recovery migration.

7. The method of claim 1 wherein making the user application available as specified by the application level SLA further comprises:
making the user application available as specified by the application level SLA without requiring that the user application administrator have access to the cluster infrastructure and without requiring participation by an infrastructure administrator.

8. The method of claim 1 further comprising:
monitoring a status of the user application running on the virtual machine, by a third process running on the virtual machine;
repeatedly transmitting the status of the user application that is being monitored, by the first process running on the virtual machine, to a process running on the cluster infrastructure;
detecting a failure of the user application running on the virtual machine, by the first process running on the virtual machine;
transmitting a message indicating the detected failure of the user application running on the virtual machine, to a fourth process running on the cluster infrastructure; and
in response to the failure of the user application, failing over the virtual machine on which the user application runs to another node in the cluster infrastructure, as specified by the application level SLA.

9. The method of claim 1 further comprising:
monitoring a status of the virtual machine on which the user application runs;
detecting a failure of the virtual machine on which the user application run; and
in response to the failure of the virtual machine on which the user application runs, failing over the virtual machine on which the user application runs to another node in the cluster infrastructure, as specified by the application level SLA.

10. A non-transitory computer readable medium storing program code that, when executed by a processor, performs a method for automatically failover according to an application level service level agreement (SLA) for availability of an user application on a high-availability cluster, with a cluster infrastructure comprising:

at least one cluster of nodes, the user application running on a virtual machine, the virtual machine running on a specific node of the at least one cluster, the method comprising the steps of:
- gleaning parameters for failover from the application level SLA, by a first process running on the virtual machine, the user application running on the virtual machine as an isolated environment from the cluster infrastructure;
- wherein the SLA was specified at an application level, by a party with access to the virtual machine but without access to the cluster infrastructure;
- configuring the virtual machine in accordance with the application level SLA;
- detecting an application level failure of the virtual machine in accordance with the application level SLA;
- transmitting the application level SLA through process-to-process communication to affect failover of the user application within the cluster infrastructure, by sending the application level SLA by the first process running on the virtual machine containing the user application to a second process running on the cluster infrastructure, wherein the first and second process are on a different nodes within the cluster;
- receiving, by the second process running on the cluster infrastructure, failover parameters specified by the application level SLA; and
- configuring failover of high-availability cluster functionality with a high-availability configuration script according to the application level SLA, by the second process running on the cluster infrastructure, such that the cluster infrastructure makes the user application available as specified by the application level SLA.

11. The non-transitory computer readable medium of claim 10 wherein determining, by a process running on the virtual machine, the application level SLA according to which the user application is to be made available further comprises:
- reading a configuration file populated by an user application administrator.

12. The non-transitory computer readable medium of claim 10 wherein receiving, by a process running on the cluster infrastructure, the application level service level agreement (SLA) that was specified at the application level further comprises:
- receiving the application level SLA by a process running on the specific node of the at least one cluster on which the virtual machine is running.

13. The non-transitory computer readable medium of claim 10 wherein using high-availability cluster functionality, by a process running on the cluster infrastructure, to configure automatically the cluster infrastructure to make the user application available as specified by the application level SLA further comprises:
- running a high-availability cluster configuration script with parameters specifying contents of the application level SLA.

14. The non-transitory computer readable medium of claim 10 wherein using high-availability cluster functionality, by the second process running on the cluster infrastructure, to configure automatically the cluster infrastructure to make the user application available as specified by the application level SLA further comprises:
- responsive to the application level SLA specifying failover support for the virtual machine on which the user application is running, making a number of nodes of the cluster infrastructure specified by the application level SLA available for failover of the virtual machine.

15. The non-transitory computer readable medium of claim 10 wherein using high-availability cluster functionality, by the second process running on the cluster infrastructure, to configure automatically the cluster infrastructure to make the user application available as specified by the application level SLA further comprises:
- responsive to the application level SLA specifying support for disaster recovery migration, making at least one additional cluster of the cluster infrastructure available for disaster recovery migration.

16. The non-transitory computer readable medium of claim 10 wherein making the user application available as specified by the application level SLA further comprises:
- making the user application available as specified by the application level SLA without requiring that an user application administrator have access to the cluster infrastructure and without requiring participation by an infrastructure administrator.

17. The non-transitory computer readable medium of claim 10 wherein the method further comprises:
- monitoring a status of the user application running on the virtual machine, by a third process running on the virtual machine;
- repeatedly transmitting the status of the user application that is being monitored, by the third process running on the virtual machine, to the third process running on the cluster infrastructure;
- detecting a failure of the user application running on the virtual machine, by a third process running on the virtual machine;
- transmitting a message indicating the detected failure of the user application running on the virtual machine, to a fourth process running on the cluster infrastructure; and
- in response to the failure of the user application, failing over the virtual machine on which the user application runs to another node in the cluster infrastructure, as specified by the application level SLA.

18. The non-transitory computer readable medium of claim 10 wherein the method further comprises:
- monitoring a status of the virtual machine on which the user application runs;
- detecting a failure of the virtual machine on which the user application run; and
- in response to the failure of the virtual machine on which the user application runs, failing over the virtual machine on which the user application runs to another node in the cluster infrastructure, as specified by the application level SLA.

19. A computer system for automatically configuring failover according to an application level service level agreement (SLA) for availability of an user application on a high-availability cluster, with a cluster infrastructure comprising:
- at least one cluster of nodes, the user application running on a virtual machine, the virtual machine running on a specific node of the at least one cluster, the computer system comprising a processor coupled to a system memory, the system memory containing the following modules which when executed by the processor perform the following steps:
  - a SLA determining module residing in the system memory, the SLA determining module gleaning parameters for failover from the application level SLA, by a first process running on the virtual machine, the user application running on the virtual machine as an isolated environment from the cluster infrastructure;

wherein the application level SLA was specified at an application level, by a party with access to the virtual machine but without access to the cluster infrastructure;

configuring the virtual machine in accordance with the application level SLA;

detecting an application level failure of the virtual machine in accordance with the application level SLA;

a transmitting module residing in the system memory, the transmitting module transmitting the application level SLA through process-to-process communication to affect failover of the user application within the cluster infrastructure, by sending the application level SLA by the first process running on the virtual machine to a second process running on the cluster infrastructure, wherein the first and second process are on a different nodes within the cluster;

a receiving module residing in the system memory, the receiving module receiving, by the second process running on the cluster infrastructure, failover parameters specified by the application level SLA; and an availability configuring module residing in the system memory, the availability configuring module configuring a failover of high-availability cluster functionality with a high-availability configuration script according to the application level SLA, by the second process running on the cluster infrastructure, such that the cluster infrastructure makes the user application available as specified by the application level SLA.

20. The computer system of claim 19 wherein the availability configuring module further:

makes the user application available as specified by the application level SLA without requiring that an user application administrator have access to the cluster infrastructure and without requiring participation by an infrastructure administrator.

* * * * *